United States Patent [19]

Morefield

[11] Patent Number: 5,007,524

[45] Date of Patent: Apr. 16, 1991

[54] APPARATUS AND METHOD FOR SAFELY ACTUATING A BELT SCRAPER MECHANISM WITH PRESSURIZED WATER

[76] Inventor: Allen J. Morefield, P.O. Box 534, Tazewell, Va. 24651

[21] Appl. No.: 560,258

[22] Filed: Jul. 30, 1990

Related U.S. Application Data

[63] Continuation of Ser. No. 232,663, Jul. 16, 1988, abandoned.

[51] Int. Cl.$^5$ ............................................. B65G 45/00
[52] U.S. Cl. ..................................... 198/499; 15/256.5
[58] Field of Search ....................... 198/497, 499, 498; 15/256.5, 256.51, 256.6

[56] References Cited

U.S. PATENT DOCUMENTS

| | | | |
|---|---|---|---|
| Re. 31,338 | 8/1983 | Hurt | 198/502.4 X |
| 3,342,312 | 9/1967 | Reiter | 198/499 |
| 3,881,401 | 5/1975 | Bimba | 92/169.1 |
| 3,973,595 | 8/1976 | Schmoll | 91/449 X |
| 4,053,045 | 10/1977 | Reiter | 198/499 |
| 4,117,706 | 10/1978 | Lami | 91/433 X |
| 4,182,444 | 1/1980 | Fisher | 198/499 |
| 4,189,046 | 2/1980 | Ward et al. | 198/499 |
| 4,242,947 | 1/1981 | Renner et al. | 92/108 |
| 4,269,301 | 5/1981 | Gibbs | 198/499 |
| 4,280,531 | 7/1981 | Milberger et al. | 91/526 X |
| 4,402,394 | 9/1983 | Stoll | 198/499 |
| 4,457,423 | 7/1984 | Stoll | 198/619 |
| 4,506,742 | 3/1985 | Fukase | 91/229 X |
| 4,520,917 | 6/1985 | Sillivent et al. | 198/499 |
| 4,533,036 | 8/1985 | Gordon | 198/499 |
| 4,633,999 | 1/1987 | Perneczky | 198/499 |
| 4,674,397 | 6/1987 | Wilcox | 91/235 |
| 4,729,224 | 3/1988 | McAteer | 91/397 X |
| 4,734,013 | 3/1988 | Valavaara | 91/502 X |
| 4,936,439 | 6/1990 | Alexander, Jr. et al. | 198/499 |

FOREIGN PATENT DOCUMENTS

| | | | |
|---|---|---|---|
| 3409076 | 9/1985 | Fed. Rep. of Germany | 198/499 |
| 3624623 | 3/1987 | Fed. Rep. of Germany | 198/499 |
| 8800916 | 2/1988 | PCT Int'l Appl. | 198/499 |

OTHER PUBLICATIONS

Wolansky et al., "Fundamentals of Fluid Power", 1977, pp. 58-68.
Machine Design, Fluid Power Reference Issue, Sep. 27, 1984, pp. 147-149.

Primary Examiner—Robert P. Olszewski
Assistant Examiner—Cheryl L. Gastineau
Attorney, Agent, or Firm—Lowe, Price, LeBlanc, Becker & Shur

[57] ABSTRACT

An apparatus and a method are provided for controllably applying a force for actuating a belt scraper mechanism by the use of pressurized water to move a cylinder slidingly contained within a cylinder preferably made of a non-corrodable and non-magnetic material. In one aspect of the invention, the water-pressurized cylinder is mounted in a manner that permits ready resetting to determine the maximum force with which the belt scraping is effected. In another aspect of the invention, the force generated by pressurized water to actuate a blade scrapper mechanism is applied thereto through resilient means capable of absorbing incidental shock loading.

20 Claims, 1 Drawing Sheet

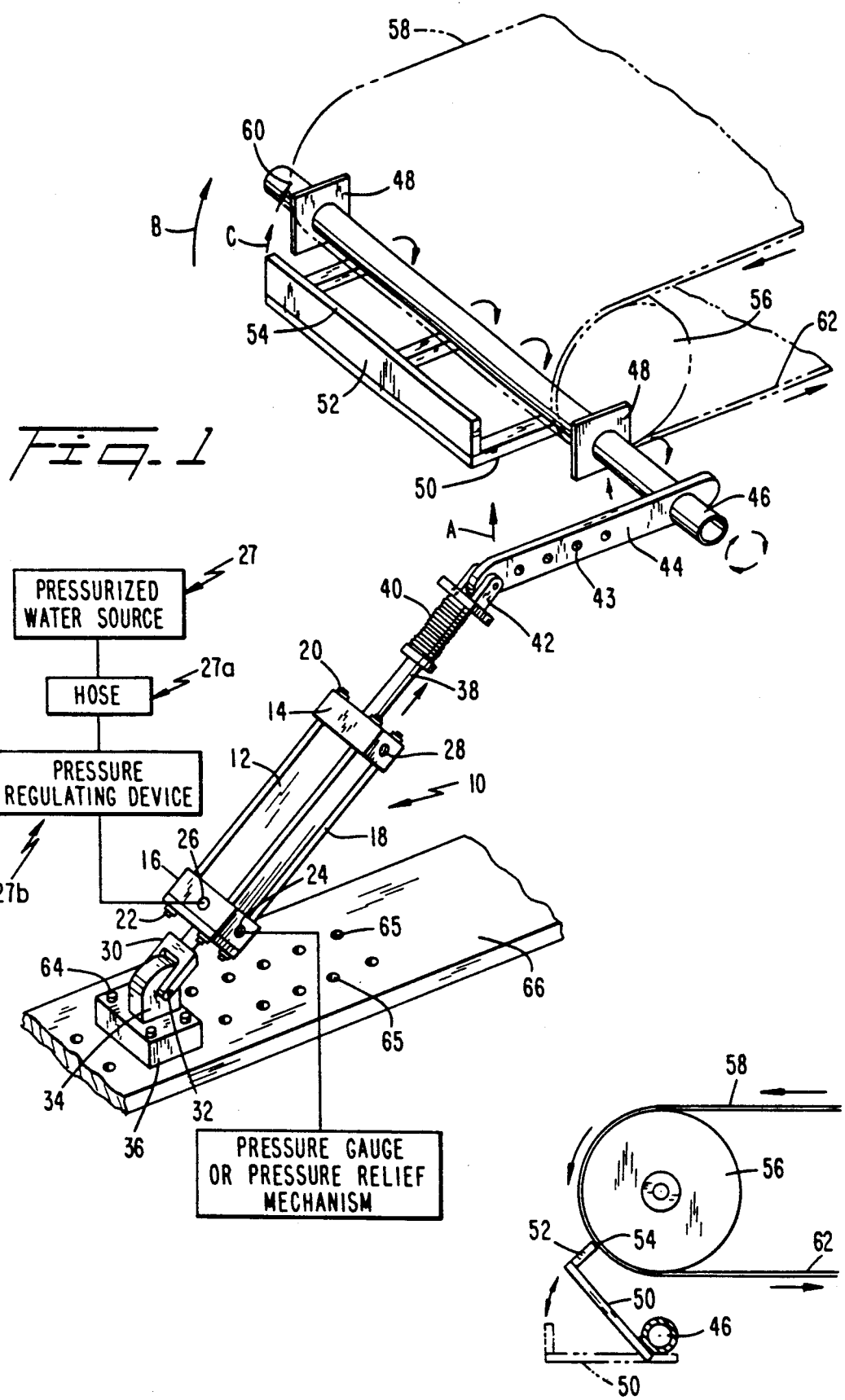

APPARATUS AND METHOD FOR SAFELY ACTUATING A BELT SCRAPER MECHANISM WITH PRESSURIZED WATER

This application is a continuation of application Ser. No. 07/232,663 filed Aug. 16, 1988, now abandoned.

TECHNICAL FIELD

This invention relates generally to apparatus and methods for actuating a belt scraper mechanism for scraping unwanted material from a moving belt and, more particularly, to apparatus and a method employing readily available pressurized water to actuate such a belt scraping mechanism in an environment where electrical discharges, flammable fluids, and sudden releases of compressed gases constitute unacceptable operational hazards.

BACKGROUND ART

In industry, numerous materials, often in granular or pebble-like form, are conveyed over long distances and may be often raised to considerable heights on an upward surface of a moving endless conveyor belt. Such materials may be dry, e.g., cement, dry ore from a mine, or even small machine components such as nuts or washers. On the other hand, with equal frequency, conveyor belts are utilized to move wet or sticky substances or objects, e.g., wet ore, pulverized coal that has been stored outside and is wet due to rain, or cooked objects such as cookies or candy. A very frequent problem encountered in the use of conveyor belts with both dry and wet materials is that after most of the material is delivered to reach a delivery point and leaves the belt, usually over a rotating end cylinder as the belt commences its return trip, some of the transported material stays on or with the belt. With dry material, with electrostatic forces sometimes responsible for the holding on of finely divided material to an electrically insulating belt, the problem usually is not very serious. On the other hand, with wet or inherently sticky materials, considerable amounts of material may stick to the belt and, thereafter, due to incidental vibration and the like, fall off below the belt support system and over a time pose serious problems.

It has long been known that the application of one or more scraper blades forcibly contacting the belt surface as it commences its return trip after going over an end cylinder helps remove material that has not separated from the belt as and when it should have. Among the numerous devices that are known in the prior art, are the one disclosed in U.S. Pat. No. 4,269,301 to Gibbs which teaches the use of a plurality of resilient scraper blades acting in tandem but individually pressed to a common belt, U.S. Pat. No. 4,182,444 to Fisher which teaches the use of a heated blade for removing materials such as hot asphalt mix, and U.S. Pat. No. 4,189,046 to Ward, deceased et al which teaches, inter alia, the use of flexible leaf springs to carry the scraper member and the provision of a cavity within the scraper member and communicating with the fluid pressure circuit that generates the force between the scraper element and the belt to deactivate the system when the scraper element has worn through to the cavity. In these and other similar prior art references the teaching almost invariably relates to the use of compressed air, with or without a pump to provide the same air pressure, as the fluid utilized in a cylinder and piston assembly to actuate the scraper blade element into scraping contact with the moving belt.

Even those prior art references which mention the use of some fluid other than compressed air, such as Ward, deceased et al, point out that it would not be desirable to allow the leakage of even a very small quantity of "hydraulic fluid" during the operation of the apparatus to actuate the blade scraper element. Such hydraulic fluid often is used at pressures in the range 1200–1500 psi. Persons skilled in the art, particularly persons familiar with the hazards that are ever present in underground operations such as mining, tunneling and the like, are usually very sensitive to the fact that in such confined quarters, in locations from which escape is usually difficult, electrical discharges, the presence of flammable fluids under high pressure or even sudden releases of compressed gases can very easily lead to explosions. These, at the very least, are extremely hazardous to life and limb and may prove life threatening. This is especially true in the mining of certain materials, e.g., coal, where there is the ever present danger of flammable gases to which the addition of compressed air in the event of a leak from the system could significantly multiply the potential danger of a hazardous explosion.

A need, therefore, exists for apparatus and methods for providing an actuating force to a belt scraping mechanism without the use of compressed air (and in particular without the use of electrically powered pumps or compressors to pressurize such compressed air supplies) or hydraulic fluids which upon the sudden release of very high pressure may form a fine mist, vapor or otherwise flammable gases.

DISCLOSURE OF THE INVENTION

Accordingly, it is an object of this invention to provide apparatus powered by pressurized water for safely actuating a belt scraper mechanism.

It is another object of this invention to provide apparatus formed of non-corrodible materials for utilizing pressurized water for safely actuating a belt scraper mechanism.

It is a further object of this invention to provide apparatus powered by pressurized water for safely actuating a belt scraper mechanism in a manner that enables a user to easily reset the apparatus to limit the maximum force exertable by a belt scraper element on a moving belt as operating circumstances change.

It is an even further object of this invention to provide apparatus powered by pressurized water for safely actuating a belt scraper mechanism in which a belt scraper element is forced resiliently to a moving belt being scraped thereby.

It is a related object of this invention to provide a method for safely actuating a belt scraper mechanism in an environment wherein electrical discharges, flammable fluids, and sudden releases of compressed gases constitute unacceptable operational hazards, by controllably applying readily available pressurized water through a cylinder and piston means for generating a force transmittable to a belt scraper element into scraping contact with a moving belt.

A more complete appreciation of the invention and many of the attendant advantages thereof will be readily perceived as the same becomes better understood by reference to the following detailed description when considered in connection with the accompanying figures.

BRIEF DESCRIPTION OF DRAWINGS

FIG. 1 is a perspective view of the apparatus according to a preferred embodiment of this invention with a scraper blade in position to be moved into scraping contact with a moving belt.

FIG. 2 schematically illustrates a convenient juxtaposition of a preferred embodiment of this invention with a moving belt system.

BEST MODE FOR CARRYING OUT THE INVENTION

Referring now to FIG. 1, the apparatus 10 according to a preferred embodiment of the present invention includes a cylinder 12 held in sealing contact with an upper end element 14 and a lower end element 16 by means of a plurality of tension rods 18 each of which applies a predetermined force to end blocks 14 and 16 by conventional heads or nuts 20 and 22 respectively. The lower end block 16 is conveniently provided with two openings 24 and 26, formed to receive known types of fittings therein. One of these openings is for connection thereto of a pressure regulating device of known type (not shown) in series with a hose for conveying pressurized water (also not shown) to act on a piston of known type slidingly contained within cylinder 12. The other of the openings in the lower end block 16 is for connection to a pressure relief mechanism (not shown) or a pressure gauge. A closable fitting 28 may be provided in the upper end block 14 to allow drainage of any pressurized water that may leak past the piston contained within cylinder 12 during use.

The pressurized water cylinder assembly 10, constituted as described in the preceding paragraphs, is conveniently mounted by an attached fork 30 rotatively supported on a pin 32 by a trunnion 34 having a base 36 that is supported as described hereinafter. A piston slidingly contained within cylinder 12 in conventional manner and movable therein by the supply of pressurized water, usually available in the range 45-300 psi, is connected to a connecting rod 38 sealingly and slidingly guided through upper end block 14. Rod 38 is thus movable, as indicated by two arrows bracketing the same in FIG. 1, in a direction parallel to the axis of cylinder 12.

The cylinder 12, the piston within, end blocks 14 and 16, and other elements can be made of non-corrodible materials such as fiberglass, plastics or reinforced composites that are readily lubricated by water without the need for externally provided lubrication. Even stainless steel may be used. Such materials also usually are non-magnetizable, thus reducing the risk of sparks and fire.

As persons skilled in the art will appreciate, the operation of any equipment involves unevenness of surface texture, incidental motions in directions normal to the directions of intended motion, and the like. Given this recognition of reality, a prudent designer will appreciate that a blade scrapper element scraping a moving belt will experience incidental shocks that could prove damaging to it. One solution to ensure against rapid damage to either the blade scraper element or to the belt under such circumstances is to design the blade scraper element to be flexible, as was proposed in the Gibbs reference cited earlier. An alternative solution, as proposed in the Ward reference cited earlier, is to mount the scrapper blade on flexible arms connected to an element rotated to obtain the scraping action.

However, the problem that remains with both these solutions is that they do not ensure uniform scraping contact along the length of the scraper blade element across the width of the belt being scrapped. As illustrated in FIG. 1, a preferred solution according to the present invention is to provide a spring clevis 40 between the distal end of connecting rod 38 and a fork element 42 that is rotatively pinned to an arm 44 rigidly connected to a shaft 46 rotatively supported in general bearing means 48.

A plurality of through holes 43 is distributed along the length of arm 44 for selective engagement of pin 42 therethrough, which persons skilled in the mechanical arts will immediately appreciate as a means to discretely adjust the moment arm at which the connecting rod force is applied about the axis of shaft 46.

Rigidly attached to a portion of shaft 46 between supporting journal bearing elements 48 is a transverse element 50 at a distal end of which is attached a scraper blade element 52 having a scraping edge 54. As is indicated in ghost lines in FIG. 1, a cylinder 56 of circular cross section is conventionally used to support and guide thereover an approaching length 58 of a moving belt which passes over the cylindrical outer surface of cylinder 56 and returns for reloading as a moving length 62 of the belt. Naturally, the scraper blade element 52 must be so positioned vis-a-vis cylinder 56 and the moving belt as to be itself movable into controlled scraping contact with moving belt length 62, as best understood with reference to FIG. 2.

Although considerable adjustment of the applied moment to rotate shaft 46 is obtained by selecting one of the plurality of through holes 43 in arm 44 for a given position of base 36, even further adjustment may be obtained by relocating attachment means 64, e.g., conventional nuts and bolts into any of paired apertures 65 in a fixed support element 66 that stays in place vis-a-vis the conveyor belt structure. Given the structure described hitherto, it is easy for a user, simply by loosening a few bolts and nuts such as 64 and/or repositioning pin 42 in any of apertures 43, to very quickly and securely adjust a component of the force providable by connecting rod 38 and the moment arm at which such a force is applied to generate a useful torque about the axis of shaft 46. There is, thus, provided in the present invention a very easily adjustable means for discretely controlling the force with which scraper blade element 52 can be applied to a length 62 of a moving belt to scrape the same. Note that the adjustment so described is in addition to and complementary of any adjustment that may be obtained by regulating the pressure of the pressurized water actuating the piston within cylinder 12.

In practice, therefore, once the user using his judgment and experience decides exactly which holes 43 and 65 to use to locate the cylinder assembly 10, he or she will set a pressure regulator of known type to limit the pressure of pressurized water that may enter cylinder 12 to a maximum value, thereby ensuring that a desired factor of safety is obtained to avoid accidental rupture of cylinder 12. He or she then operates whatever controls are necessary, e.g., a valve, to provide pressurized water to cylinder 12 to generate an outward motion of connecting rod 38 vis-a-vis cylinder 12, so that a force is applied as indicated by arrow "A" in a direction normal to arm 44. This will cause shaft 46 and the attached scraper blade assembly to rotate clockwise as illustrated in FIG. 1.

The scraper blade assembly therefore moves in an arcuate path, as indicated by the curved arrow B, toward contact with the belt 58 passing over the outer surface of cylinder 56. Upon sufficient movement of blade element 52, the scraping edge 54 thereof will move as indicated by the arrows C into scraping contact along a line 60 (parallel to the axis of shaft 46) so that substantially the entire length of blade edge 54 is controllably pressed against the outer surface of turning moving length 62 of the conveyor belt. For most applications it may be most convenient to ensure that this line of contact 60 is located so that scraper blade edge 54 presses on the conveyor belt in a manner resisted by the outer surface of cylinder 56.

It should be understood that the provision of a spring clevis 40 need not in any way diminish the maximum force applied by the cylinder assembly utilizing pressurized water at an available pressure to effect the blade scraping action on the conveyor belt. Rather, it ensures that incidental and occasional shocks due to the scraping contact between scraper blade 52 and the moving conveyor belt do not generate unacceptably high local forces or stresses that could rapidly damage either or both of the scraper blade 52 or the moving conveyor belt. As persons skilled in the art will immediately appreciate, spring clevis 40 may also include a damping means of conventional type so that spring clevis 40 is not merely an elastic spring but may be a combination of an elastic spring and a damping element, i.e., a resilient force transmitting element capable of absorbing some incidental shock loads.

It should be fully appreciated that incidental to many mining operations, in order to enable cleaning of equipment, and as a means for fighting fires, an abundant supply of water at relatively high pressure is almost always available in mines. The present invention seeks to utilize this ready availability of pressurized water to obtain a highly desirable belt scraping action in a manner that is entirely safe and compatible with the use of equipment in sensitive locations without increasing any operational hazards that are inherent in this situation. In other words, utilizing pressurized water as taught herein to obtain belt scraping action in an otherwise hazardous environment provides a safe and effective solution to a long felt need. Actually, any safe, i.g., nonflammable liquid available at a sufficiently large hydrostatic head from a readily accessible supply maintained at a height above the cylinder 12, may be used in place of pressurized water to obtain the benefits taught herein.

The invention now being fully described, it will be apparent to one of ordinary skill in the art that many changes and modifications can be made thereto without departing from the spirit or scope of the invention as set forth herein.

What is claimed is:

1. System for cleaning a moving conveyor belt, comprising, in combination:
   (a) a moving conveyor belt; and
   (b) apparatus including a belt cleaning mechanism powered by pressured water for safely acutating the belt cleaning mechanism, said apparatus including:
   cylinder means for receiving said pressurized water at a pressure sufficient to move a piston slidingly guided within the cylinder means and connected to a force transmitting connecting rod;
   means for connecting said connecting rod to said belt cleaning mechanism to actuate a scraper thereof into a belt cleaning position to scrape the moving belt with a controllable scraping action, wherein said piston and cylinder arrangement includes a pair of end blocks respectively at opposite ends of the cylinder and a plurality of tension rods extending between the end blocks along the sides of the cylinder and means fore applying a predetermined force to the end blocks through the tension rods to close off opposite ends of the cylinder, wherein at least said end blocks, cylinder and said piston having materials having water contacting surfaces which are non-corrodible by water.

2. The system of claim 1, wherein said tension rods extend through the end blocks along the exterior of the cylinder and said predetermined force applying means includes screw nut means for applying said predetermined force to said end blocks.

3. The system of claim 1, wherein the lower end block is provided with a fitting through which said pressurized water enters the lower end of the cylinder.

4. The system of claim 3, wherein said upper end block is provided with a closeable fitting to allow drainage of any pressurized water that may leak past the piston contained within the cylinder during use.

5. The system of claim 1, wherein said non-corrodible materials comprise at least one material chosen from a group including fiberglass, plastics, reinforced composites and stainless steel.

6. The system of claim 1, further comprising easily detachable positioning means for positioning said cylinder means in a position selected with respect to said belt scraper mechanism to thereby determine a maximum force exertable on said belt scraper mechanism on said moving belt to scrape the same.

7. The system of claim 1, further comprising pressure regulating means for regulating a pressure exerted by said pressurized water on said piston, said pressure regulating means being located adjacent to said cylinder means for easy access thereto by a user.

8. The system of claim 1, further comprising resilient means intermediate said connecting rod and said belt scraper mechanism for providing a resilient connection therebetween.

9. The system of claim 1, wherein said pressurized water is supplied at a pressure of about 45–300 psi.

10. The system of claim 1, wherein said cylinder means is a single acting cylinder with means for receiving pressurized water supplied to a one end of said cylinder to move said piston towards and maintain said piston at the other end of said cylinder causing actuation of said connecting rod and movement of said belt scraper mechanism into scraping position with said belt, disruption of pressurized water to said cylinder means allowing said piston to be movable back towards said one end.

11. The system of claim 1, wherein said system is used in a mining environment and a source of said pressurized water is an abundant supply of water normally available for cleaning of equipment and fighting of fires, and further including hose means for conveying said pressurized water to the cylinder means through the lower end block thereof.

12. Apparatus for cleaning a moving conveyor belt, comprising:

a belt cleaning mechanism powered by pressurized water for safely actuating the belt cleaning mechanism;

cylinder means for receiving said pressurized water at a pressure sufficient to move a piston slidingly guided within the cylinder means and connected to a force transmitting connecting rod;

means for connecting said connecting rod to said belt cleaning mechanism to actuate a scraper thereof into a belt cleaning position to scrape the moving belt with a controllable scraping action, wherein said piston and cylinder arrangement includes a pair of end blocks respectively at opposite ends of the cylinder and a plurality of tension rods extending between the end blocks along the sides of the cylinder and means for applying a predetermined force to the end blocks through the tension rods to close off opposite ends of the cylinder, at least said end blocks, cylinder and said piston having materials having water contacting surfaces which are non-corrodible by water.

13. The apparatus of claim 12, wherein said tension rods extend through the end blocks along the exterior of the cylinder and said force applying means includes screw nut means for applying said predetermined force to said end blocks.

14. The apparatus of claim 12, wherein the lower end block is provided with a fitting through which said pressurized water enters the lower end of the cylinder.

15. The apparatus of claim 12, wherein said upper end block is provided with a closable fitting to allow drainage of any pressurized water that may leak past the piston contained within the cylinder during use.

16. The apparatus of claim 12, wherein said non-corrodible materials comprise at least one material chosen from a group including fiberglass, plastics, reinforced composites and stainless steel.

17. The apparatus of claim 12, further comprising easily detachable positioning means for positioning said cylinder means in a position selected with respect to said belt scraper mechanism to thereby determine a maximum force exertable on said belt scraper mechanism on said moving belt to scrape the same.

18. The apparatus of claim 12, further comprising pressure regulating means for regulating a pressure exerted by said pressurized water on said piston, said pressure regulating means being located adjacent to said cylinder means for easy access thereto by a user.

19. The apparatus of claim 12, further comprising resilient means intermediate said connecting rod and said belt scraper mechanism for providing a resilient connection therebetween.

20. The apparatus of claim 12, wherein said cylinder means in a single acting cylinder with means for receiving pressurized water supplied to a one end of said cylinder to move said piston towards and maintain said piston at the other end of said cylinder causing actuation of said connecting rod and movement of said belt scraper mechanism in to scraping position with said belt, disruption of pressurized water to said cylinder means allowing said piston to be movable back towards said one end.

* * * * *